(12) United States Patent
Nicastro

(10) Patent No.: US 9,131,358 B2
(45) Date of Patent: Sep. 8, 2015

(54) CUSTOMIZED CALLER ID FOR MOBILE PHONE

(71) Applicant: Marie-Helene Nicastro, Gatineau (CA)

(72) Inventor: Marie-Helene Nicastro, Gatineau (CA)

( * ) Notice: Subject to any disclaimer, the term of this patent is extended or adjusted under 35 U.S.C. 154(b) by 0 days.

(21) Appl. No.: 14/145,964

(22) Filed: Jan. 1, 2014

(65) Prior Publication Data

US 2014/0187216 A1    Jul. 3, 2014

Related U.S. Application Data

(60) Provisional application No. 61/848,360, filed on Jan. 2, 2013.

(51) Int. Cl.
*H04W 4/16* (2009.01)
*H04W 4/12* (2009.01)
*H04W 4/18* (2009.01)

(52) U.S. Cl.
CPC *H04W 4/16* (2013.01); *H04W 4/12* (2013.01); *H04W 4/18* (2013.01)

(58) Field of Classification Search
CPC .......................... H04M 3/42042; H04W 4/12
USPC ............... 455/415, 464, 461, 445; 379/88.19, 379/142.01
See application file for complete search history.

(56) References Cited

U.S. PATENT DOCUMENTS

2008/0137828 A1* 6/2008 Chmaytelli .............. 379/142.01
2012/0219128 A1* 8/2012 Farah et al. ................ 379/88.19

* cited by examiner

*Primary Examiner* — Phuoc H Doan
(74) *Attorney, Agent, or Firm* — Nixon Peabody LLP

(57) ABSTRACT

The present invention is generally directed toward a system for modifying caller identification (Caller ID) information by an outgoing caller on a mobile device. The system includes a storage means for storing Caller ID information prepared by a telecommunications provider, a telecommunications provider Caller ID module configured to transmit the Caller ID information to a receiving party, and a mobile device Caller ID module stored on the mobile device and configured to display the name associated with the Caller ID information on the mobile device. The mobile device Caller ID module is configured to customize the name by the outgoing caller and transmit the customized name to the telecommunications provider Caller ID module. The customized name is then transmitted in place of the telephone account name to the receiving party as part of the Caller ID information.

13 Claims, 2 Drawing Sheets

CUSTOMIZED CALLER ID FOR MOBILE PHONE

REFERENCE TO PENDING APPLICATIONS

This application claims the benefit of pending U.S. Provisional Patent Application No. 61/848,360 filed on Jan. 2, 2013.

BACKGROUND OF THE INVENTION

The present invention relates to generally to caller identification information and more specifically, to customizing Caller ID information by the outgoing caller on their mobile phone to be received by the receiving party.

Currently, telecommunication systems include a caller (calling party) ID capability that transmits an outgoing caller's number to the called party's telephone equipment during the ringing signal, or when the call is being set up but before the call is answered. Further, this capability can also provide the name associated with the calling telephone number. The information made available to the called party may be displayed on a telephone's display, on a separately attached device, or personal computer.

The ability to modify the name and/or phone number of a Caller ID information is known in the prior art. However, the ability to modify this information is complex usually involving an Internet based website and/or special hardware.

Thus, there is a need for a simplified Caller ID modification system that can be personalized by the outgoing caller using nicknames, sentences, questions, exclamations, inspirational thoughts, cute words, and the like.

SUMMARY OF THE INVENTION

The present invention satisfies the needs discussed above. The present invention relates to generally to caller identification information and more specifically, to customizing Caller ID information by the outgoing caller on their mobile phone to be received by the receiving party.

The present invention provides a new and fresh vision to the Caller ID possibilities. It allows for a lighter note to a stressful world and with the goal of creating playful mystery and the use of imagination and creative minds. The modification to the Caller ID information can be nicknames, such as Smarty Pants, Bambi, Chocolate baby, Tiger, Pink Sugar, Midnight Princess, Shopping Addict, Snowball, Smile from New York City; o) or phrases, such as Keep Believing, Keep Strong, and Midnight Walk?. Teenagers could be able to try to guess who the caller among their friends is. For lovers it is such a romantic way to speak to your special someone.

In one aspect of the present invention a system for modifying caller identification (Caller ID) information by an outgoing caller on a mobile device is disclosed. The system includes a storage means for storing Caller ID information. This storage means is prepared by a telecommunications provider. The Caller ID information includes the name and telephone number associated with a telephone account. Further, a telecommunications provider Caller ID module is provided and is configured to transmit the Caller ID information to a receiving party.

The system further includes a mobile device having a Caller ID module. This module is configured to display the name associated with the Caller ID information on the mobile device. The module is also configures to allow the Caller ID name to be modified by the user of the mobile device. This modification is temporary and does not change the account name, but rather the identification that is transmitted to, and display on, the receiving party's telephone equipment. This modification can be a complete replacement with a nickname or word or a complete replacement with a phrase, inspirational thought, etc. Examples of nicknames can include: High Heels Diva, Your special Christmas elf, Delicious Diva, Princess of Skates, Your favorite clumsy girl, California dreamer, Tiger, Smarty pants. Examples of inspirational thoughts can include: Believe in your dreams and never give up, Keep calm and moving, Big success means taking big risks, Big confidence big success, Happy birthday, Feel the moment, Family is everything, Keep smiling. Examples of mysterious, playful sentences can include: Remember me, Do you feel the European vibe calling you, Can't stop thinking about you, How's my Frosty Smoothie this morning?, You are always in my thoughts, Can't wait to see you, Never felt this way before . . . . Examples of sentences with a question include: Midnight swim at Santa Monica pier?, Skating under the snowflakes at Central Park at 7 pm?, Shopping at Bayshore tonight?, Movie late in the evening?, Mediterranean cuisine for lunch? The module is also configured to transmit the customized Caller ID information to the telecommunications provider Caller ID module.

The system then further includes the replacement of the telephone account name with the customized Caller ID information and transmits it in place of the telephone account name as part of the Caller ID information.

Another aspect of the present invention discloses the telecommunications provider Caller ID module searching a list of prohibited words for the customized Caller ID information, such as proper names such as Bill, Sally, etc. or generic descriptive words such as grandson, nephew, political parties, hospital, bank, etc, If there is a match transmits the telephone account name and not the customized Caller ID information. This helps to prevent the use of a name, word or phrase that would be confusing, misleading or otherwise inappropriate.

Still further, another aspect of the present invention disclosed the telecommunications provider Caller ID module alternately transmitting the telephone account name and the customized Caller ID information.

Upon reading the included description, various alternative embodiments will become obvious to those skilled in the art. These embodiments are to be considered within the scope and spirit of the subject invention, which is only, limited by the claims which follow and their equivalents.

DESCRIPTION OF THE PREFERRED EMBODIMENTS

The present invention relates to generally to caller identification information and more specifically, to customizing Caller ID information by the outgoing caller on their mobile phone to be received by the receiving party.

Figure 1:
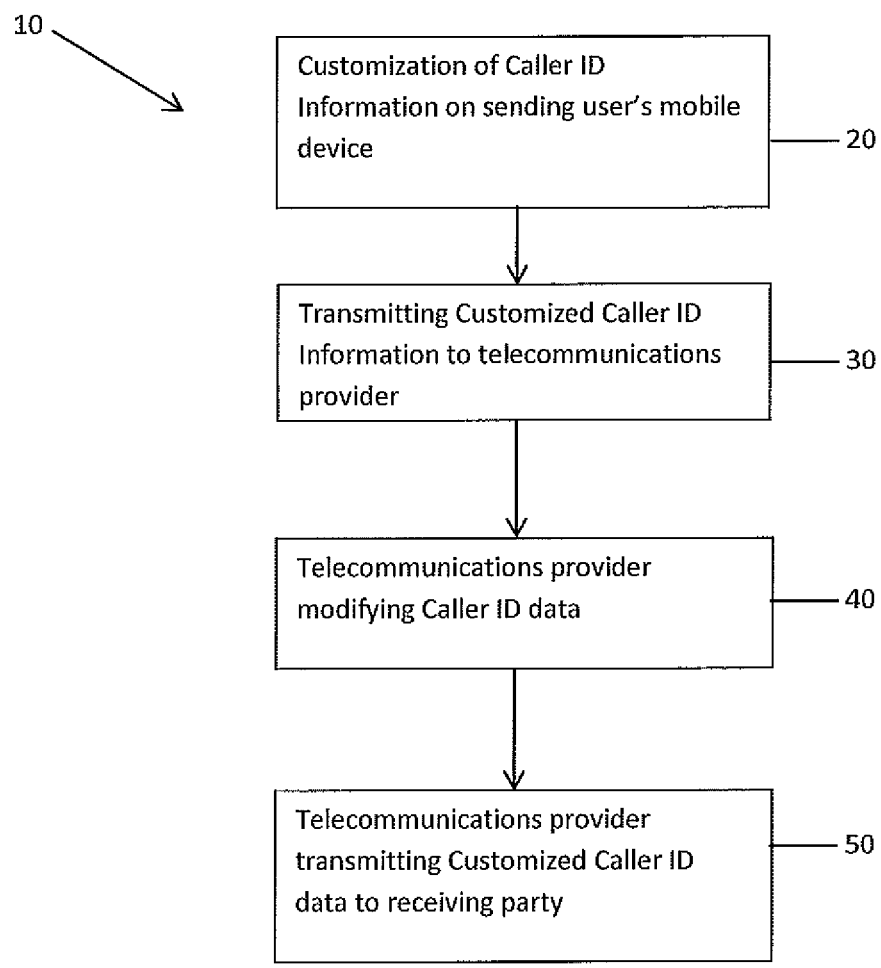
FIG. 1 is a schematic of an embodiment of the system of the present invention.
Figure 2:
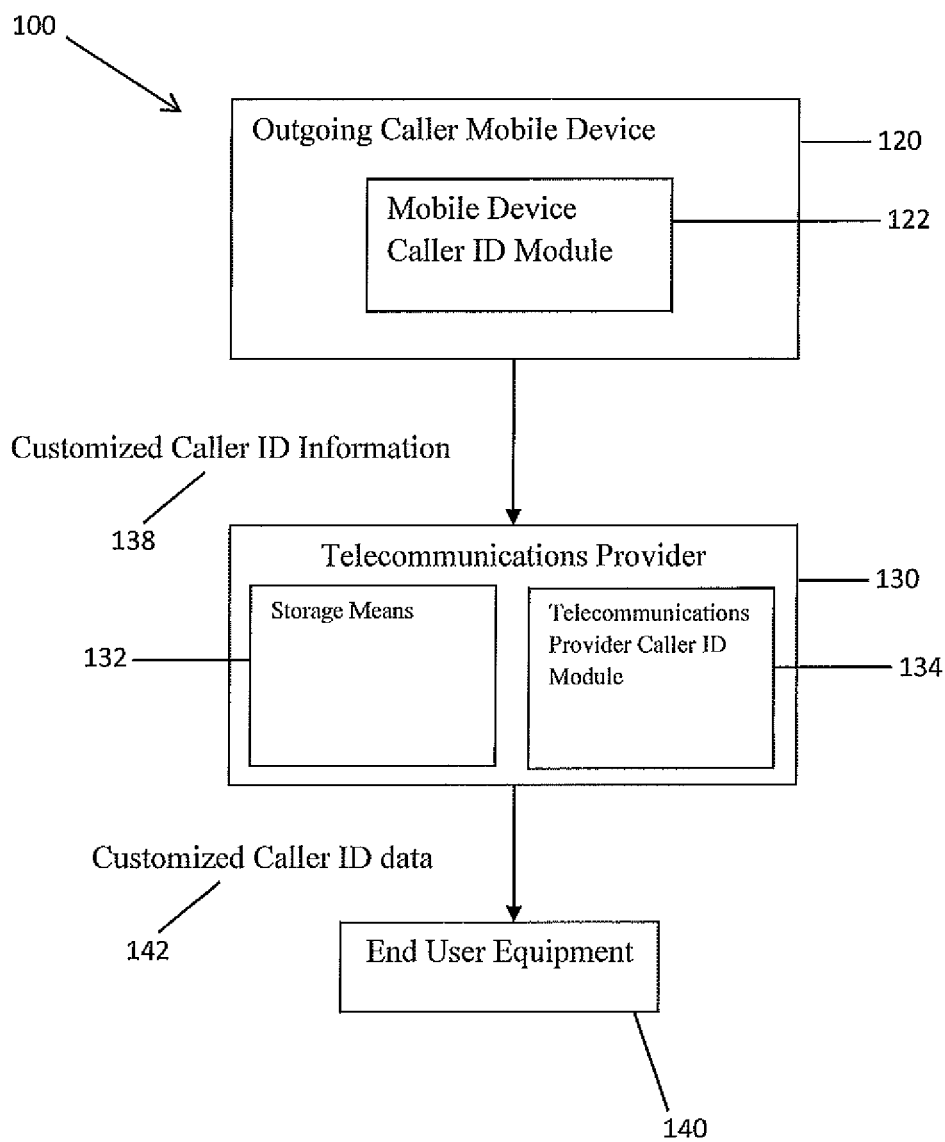
FIG. 2 is a block diagram of an embodiment of the system of the present invention.

As illustrated in FIGS. 1 and 2, an embodiment 10 of the inventive system is disclosed. Examining the invention in more detail, embodiment 10 illustrates a system for modifying caller identification (Caller ID) information by an outgoing caller on a mobile device. Embodiment 10 includes a storage means 132 for storing Caller ID information prepared by a telecommunications provider, said Caller ID information relating to the name and telephone number associated with a telephone account. This storage means 132 can be any standard type of storage media capable of digitally storing data. Storage means 132 is in communication with telecommunications provider Caller ID module 134, which is configured to transmit Caller ID data to a receiving party.

A mobile device Caller ID module 122 is stored on the outgoing caller's mobile device 120. It is configured to display the name associated with the Caller ID information on the mobile device. Further, it is configured to customize the Caller ID name by the outgoing caller 20. The mobile device Caller ID module 122 is further configured to transmit the customized Caller ID information 30 to the telecommunications provider Caller ID module 134.

The telecommunications provider Caller ID module 134 is further configured to replace the telephone account name with the customized nickname 40 and transmits 142 the customized nickname or phrase in place of the telephone account name as part of the Caller ID information 50.

Additional embodiments provide for storage means 132 having a list of prohibited words and/or phrases. Telecommunications provider Caller ID module 134 further has the capability of searching this list of prohibited words for the customized Caller ID information. If there is a positive match, telecommunications provider Caller ID module 134 does not replace the telephone account word with the modified word.

Additional embodiments provide for telecommunications provider Caller ID module 134 further having the capability of jointly transmitting the telephone account name and the customized nickname, such that the receiving party receives both telephone account name and customized nickname, along with the telephone number. This transmission can be alternately or the customized nickname followed by the telephone account name.

Additional embodiments provide for mobile device Caller ID module 122 further having the capability of associating a specific different word or phrase with a specific receiving party.

Additional embodiments provide for mobile device Caller ID module 122 further having the capability of limiting the numerical modifications to the customized Caller ID information 30 to a few digits, i.e. 2 to 5 numbers, or further limiting the numerical modifications to reflect a different telephone number than the telephone number associated with the telephone account. This would be performed such that false telephone numbers could not be included in the customized Caller ID information 30 in order to prevent the use of a name, word or phrase that would be confusing, misleading or otherwise inappropriate.

In operation, a sending party is able to modify the name that will be seen by a receiving party. When a telephone call is made in the ordinary course by a sending party where Caller ID data will be transmitted to the receiving party, the modified Caller ID data will be sent to the receiving party. The telecommunications service provider that controls and sends the Caller ID data could have a list of non-allowable words so as to prevent confusing, misleading or otherwise inappropriate communications.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

I claim:

1. A system for modifying caller identification (Caller ID) information by an outgoing caller on a mobile device, said system comprising:
   storage for storing Caller ID information prepared by a telecommunications provider, said Caller ID information relating to the name and telephone number associated with a telephone account;
   a telecommunications provider Caller ID module to transmit the Caller ID information to a receiving party; and
   a mobile device Caller ID module located on the mobile device to display the name associated with the Caller ID information on the mobile device,
      wherein said device Caller ID module customizes said name by the outgoing caller,
      wherein said device Caller ID module transmits the customized name to the telecommunications provider Caller ID module,
      wherein said customized name is limited to a maximum number of characters, and
      wherein said telecommunications provider Caller ID module transmits the customized name
         (1) either in place of the telephone account name as part of the Caller ID information; or
         (2) together with the telephone account name.

2. The system of claim 1, wherein said telecommunications provider Caller ID module transmits the customized name together with the telephone account name, and
   further wherein said provider Caller ID module alternately transmits the telephone account name and the customized name.

3. The system of claim 1,
   wherein the customized name is a different word or phrase, and
   wherein the mobile device Caller ID module replaces said name by the outgoing caller with the customized name.

4. The system of claim 3, wherein said telecommunications provider Caller ID module transmits the customized name together with the telephone account name,
   and further wherein said provider Caller ID module alternately transmits the telephone account name and the customized name.

5. The system of claim 3, wherein said telecommunications provider Caller ID module transmits the customized name together with the telephone account name, and
   further wherein said provider Caller ID module transmits the customized name followed by the telephone account name.

6. The system of claim 1, wherein the mobile device Caller ID module associates a specific different word or phrase with a specific receiving party.

7. A system for modifying caller identification (Caller ID) information by an outgoing caller on a mobile device, said system comprising:
   storage for storing
      (1) Caller ID information prepared by a telecommunications provider, said Caller ID information relating to the name and telephone number associated with a telephone account, and
      (2) a list of prohibited words;
   a telecommunications provider Caller ID module to transmit the Caller ID information to a receiving party; and
   a mobile device Caller ID module located on the mobile device to display the name associated with the Caller ID information on the mobile device,
      wherein said mobile device Caller ID module customizes said name by the outgoing caller, wherein said mobile device Caller ID module transmits the customized name to the telecommunications provider Caller ID module, wherein said customized name is limited to a maximum number of characters, and wherein said telecommunications provider Caller ID module searches the list of prohibited words for the customized name, (1) wherein if there is a match, said provider called ID module transmits the telephone account name and not the customized name, and (2) wherein if there is no match, said provider called ID module transmits the customized name
(a) either in place of the telephone account name as part of the Caller ID information, or
(b) together with the telephone account name.

8. The system of claim 7, wherein said list of prohibited words comprises one or more proper names.

9. The system of claim 7, wherein said list of prohibited words comprises one or more generic descriptive words.

10. The system of claim 7, wherein if there is no match, said telecommunications provider Caller ID module transmits the customized name together with the telephone account name, and further wherein said provider Caller ID module alternately transmits the telephone account name and the customized name.

11. The system of claim 7, wherein if there is no match, said telecommunications provider Caller ID module transmits the customized name together with the telephone account name, and further wherein said provider Caller ID module transmits the customized name followed by the telephone account name.

12. The system of claim 7, wherein said list of prohibited words is used by the telecommunications provider to prevent confusing, misleading or inappropriate communications.

13. The system of claim 7, wherein the device Caller ID module associates a specific different word or phrase with a specific receiving party.

\* \* \* \* \*